United States Patent
Chen et al.

(10) Patent No.: US 9,907,103 B2
(45) Date of Patent: Feb. 27, 2018

(54) MOBILE TERMINAL, WEARABLE DEVICE, AND EQUIPMENT PAIRING METHOD

(71) Applicants: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

(72) Inventors: Guangzeng Chen, Guangdong (CN); Siwei Xu, Guangdong (CN)

(73) Assignees: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

( * ) Notice: Subject to any disclaimer, the term of this patent is extended or adjusted under 35 U.S.C. 154(b) by 0 days.

(21) Appl. No.: 14/894,768

(22) PCT Filed: May 31, 2013

(86) PCT No.: PCT/CN2013/076533
§ 371 (c)(1),
(2) Date: Nov. 30, 2015

(87) PCT Pub. No.: WO2014/190534
PCT Pub. Date: Dec. 4, 2014

(65) Prior Publication Data
US 2016/0105923 A1    Apr. 14, 2016

(51) Int. Cl.
H04B 7/00    (2006.01)
H04W 76/02    (2009.01)
(Continued)

(52) U.S. Cl.
CPC .......... *H04W 76/023* (2013.01); *G06F 3/017* (2013.01); *H04W 4/008* (2013.01); *H04W 88/02* (2013.01)

(58) Field of Classification Search
None
See application file for complete search history.

(56) References Cited

U.S. PATENT DOCUMENTS 9,100,493 B1 *    8/2015    Zhou ................ H04M 1/72522
2007/0188323 A1 *    8/2007    Sinclair .............. G06F 21/445
340/568.1

(Continued)

FOREIGN PATENT DOCUMENTS

CN    102273184 A    12/2011
CN    102340863 A    2/2012

OTHER PUBLICATIONS

International Search Report dated Mar. 6, 2014 received from International Application No. PCT/CN2013/076533.

(Continued)

*Primary Examiner* — Mohammed Rachedine
(74) *Attorney, Agent, or Firm* — Scully, Scott, Murphy & Presser, P.C.

(57) ABSTRACT

The present invention provides a mobile terminal includes a first information recording unit configured to record first motion information of the mobile terminal, and a first pairing processing unit configured to generate a first pairing request. The first pairing request includes the first motion information which will be used as a pairing key, or a second pairing request is parsed. The second pairing request is received from a wearable device by a first data interaction unit, and the second pairing request includes second motion information from the wearable device which will be used as a pairing key. When the second motion information matches the first motion information, the first pairing processing unit (Continued)

generates a response message for the second pairing request, to realize pairing and connection between the mobile terminal and the wearable device. The present invention further provides a wearable device and a pairing method.

13 Claims, 7 Drawing Sheets

(51) Int. Cl.
*H04W 88/02* (2009.01)
*G06F 3/01* (2006.01)
*H04W 4/00* (2018.01)

(56) References Cited

U.S. PATENT DOCUMENTS

2007/0213045 A1 9/2007 Hermansson et al.
2010/0167646 A1 7/2010 Alameh et al.
2012/0254987 A1* 10/2012 Ge ................... H04L 63/0492
726/19

OTHER PUBLICATIONS

Extended European Search Report received in related PCT/CN2013076533 dated Nov. 28, 2016.

* cited by examiner

MOBILE TERMINAL, WEARABLE DEVICE, AND EQUIPMENT PAIRING METHOD

FIELD OF THE TECHNICAL

The present disclosure relates to wireless communication technology field, and particularly to a mobile terminal, a wearable device, and an equipment paring method.

BACKGROUND

More and more companies begin to design and produce smart wearable devices, such as smart watches, smart glasses, smart running shoes, and so on. These wearable devices are a combination of conventional watches, glasses, shoes, and other items which can be worn on the body and intelligent technical solution of information transmission and receipt, information look-up, and information search, and so on, thus people can enjoy the pleasure and convenience brought by technology without affording greater burden when carrying and without affording greater learning cost. For example, a user can perform an operation to look up a received short message or send an e-mail by a smart watch or other wearable device without taking out his/her mobile phone.

However, as it needs to make wearable devices be portable and simple, the volume is always limited. Thus, high power management requirement is needed. Thus, generally, wearable devices do not have communication function when used alone, and when connected to other mobile terminals, e.g., mobile phones, these mobile terminals can transmit messages to the wearable devices after receiving communications events.

In the existing technology, take a smart watch for an example, if it needs to pair the smart watch with a mobile terminal, it needs to open wireless connection modules (such as Bluetooth, wife, and so on) of both. The mobile terminal searches wireless devices surrounding the mobile terminal. After the smart watch is found, the mobile terminal transmits a pairing request. The smart watch responds to the pairing request after receiving the pairing request. A pairing password (such as a PIN code of Bluetooth, a wifi password) is input through the mobile terminal after the mobile terminal receives the response generated by the smart watch. After the smart watch determines that the password is right, the pairing request is confirmed to realize pairing.

It can be seen that in the above-described process wearable devices are processed as common mobile terminals, the pairing process is complicated, the usage characters of the wearable devices are not fully utilized, and it is not beneficial for users to use wearable devices.

SUMMARY

Based on the above-mentioned problems, the present invention provides a new technical solution. By means of the technical solution, the synchronicity between the wearable device and the user's limb on which the wearable device is worn can be fully utilized, to achieve pairing and connection between the terminal and the wearable device conveniently and accurately.

The present invention provides a mobile terminal which includes a first information recording unit configured to record first motion information of the mobile terminal, and a first pairing processing unit configured to generate a first pairing request. The first pairing request includes the first motion information which will be used as a pairing key, or a second pairing request is parsed. The second pairing request is received from a wearable device by a first data interaction unit, and the second pairing request includes second motion information from the wearable device which will be used as a pairing key. Wherein, when the second motion information matches the first motion information, the first pairing processing unit is further configured to generate a response message for the second pairing request, to realize pairing and connection between the mobile terminal and the wearable device. The first data interaction unit is configured to transmit the first pairing request, or configured to receive the second pairing request and transmit the corresponding response message.

In the technical solution, as the wearable device is worn by a user, for example, a smart watch is worn on the user's wrist, e.g., the wrist of the left hand, when the mobile terminal is hold by the left hand of the user and the user moves the left hand, e.g., waves the left hand left and right, shakes the left hand up and down, the motion of the smart watch and the mobile terminal is synchronous. In this process, what's only needed is that the hand holding the mobile terminal is the hand on which the wearable device (e.g., smart watch) is worn, and no special request is needed. That is, it only needs the user to hold the mobile terminal when doing exercise, and the characteristic of that the wearable device can be worn on the user can be fully utilized.

Therefore, when the user does exercise with the wearable device and the mobile terminal carried around, as the motion of the wearable device and the mobile terminal is synchronous, other terminals can be excluded according to the motion information of the mobile terminal and the wearable device by respectively utilizing the motion information of the mobile terminal and the wearable device as the pairing keys in the pairing requests, and the mobile terminal and the wearable device can be directly determined, which is beneficial for simplifying user's operation and increasing accuracy of pairing.

In the above-described technical solution, preferably, the first motion information recorded by the first information recording unit includes first motion parameters of the mobile terminal and/or time corresponding to the first motion parameters. The second motion information parsed by the first pairing processing unit includes second motion parameters of the wearable device and/or time corresponding to the second motion parameters.

In the technical solution, for the wearable device and the mobile terminal which motion is synchronous, as both do same movement at the same time, according to synchronicity of the motion parameters, synchronicity of the motion time, or a combination of both, the wearable device and the mobile terminal can be effectively recognized and determined. When the motion parameters or the motion time is used to make a pairing and recognition, it is beneficial for simplifying the structure of the mobile terminal or the wearable device and decreasing the cost. When a combination of the motion parameters and the motion time is used to make a pairing and recognition, it is beneficial for increasing the accuracy of pairing and recognition. It should be illustrated that the time corresponding to the first/second motion parameters refers to the start and end time of obtaining the first/second motion parameters, and/or an interval between the start time and the end time.

In the above-described technical solution, preferably, the first motion parameters and the second motion parameters respectively include at least one of or a combination of the following: motion direction, motion speed and/or motion acceleration speed, and motion distance. Wherein, the motion speed includes a linear speed and/or an angular speed, and the motion acceleration speed includes a linear acceleration speed and/or an angular acceleration speed. The mobile terminal can further determine a corresponding motion track according to its motion direction and motion distance, and the motion track is used as the motion parameters to recognize and determine the other party, and the wearable device can further determine a corresponding motion track according to its motion direction and motion distance, and the motion track is used as the motion parameters to recognize and determine the other party.

In the technical solution, preferably, the mobile terminal further includes a first status determining unit configured to determine whether or not the mobile terminal has entered a triggering state of pairing. Wherein, when the mobile terminal has entered the triggering state of pairing, the first pairing processing unit executes the corresponding operation.

In the technical solution, as the user may walk, run, or do other movement, the mobile terminal and the wearable device may be always in a motion status. Thus, to avoid pairing and connection caused by accident, in particular, under the condition that connection between both is cut off in response to user' operation due to low power of one party, whether or not the motion information needs to be collected and whether or not it needs to execute a pairing and connection operation on the mobile terminal and the wearable device may be determined according to determination of the status of the mobile terminal and the wearable device.

In the above-mentioned technical solution, preferably, the first status determining unit includes a first instruction receiving and determining sub-unit and/or a first information comparing and determining sub-unit. Wherein, the first instruction receiving and determining sub-unit is configured to determine whether or not the mobile terminal has received a triggering and starting instruction generated in response to user's operation before the first information recording unit records the first motion information. If yes, it can be determined that the mobile terminal has entered the triggering status of pairing. The first information comparing and determining sub-unit is configured to compare the first motion information with preset motion information. If the first motion information satisfies the preset motion information, it can be determined that the mobile terminal has entered the triggering status of pairing.

In the technical solution, under one condition, before executing the pairing and connection operation, the pairing function of the mobile terminal or the wearable device is enabled in response to user's operation, for example, in response to a designated instruction input by the user or in response to a press on a designated button. Then, the mobile terminal or the wearable device executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal or the wearable device automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal or the wearable device satisfies the preset motion information, the mobile terminal or the wearable device automatically determines that it needs to execute the pairing operation, and generates the corresponding pairing request or executes a parsing operation and a determination and process operation on the received pairing request according to the collected motion information corresponding to the preset motion information.

The present invention further provides a wearable device which can be paired with the mobile terminal described in the above-described technical solution. The wearable device includes a second information recording unit configured to record second motion information of the wearable device, and a second pairing processing unit configured to generate a second pairing request. The second pairing request includes the second motion information which will be used as a pairing key, or the first pairing request which is received from the mobile terminal by a second data interaction unit is parsed. Wherein, when the parsed first motion information matches the second motion information, the second pairing processing unit is further configured to generate a response message for the first pairing request, to realize pairing and connection between the wearable device and the mobile terminal. The second data interaction unit is configured to transmit the second pairing request, or configured to receive the first pairing request and transmit the corresponding response message.

In the technical solution, as the wearable device is worn by a user, for example, a smart watch is worn on the user's wrist, e.g., the wrist of the left hand, when the mobile terminal is hold by the left hand of the user and the user moves the left hand, e.g., waves the left hand left and right, shakes the left hand up and down, the motion of the smart watch and the mobile terminal is synchronous. In this process, what's only needed is that the hand holding the mobile terminal is the hand on which the smart watch is worn, and no special request is needed. That is, it only needs the user to hold the mobile terminal when doing exercise, and the characteristic of that the wearable device can be worn on the user can be fully utilized.

Therefore, when the user does exercise with the wearable device and the mobile terminal carried around, as the motion of the wearable device and the mobile terminal is synchronous, other terminals can be excluded according to the motion information of the mobile terminal and the wearable device by respectively utilizing the motion information of the mobile terminal and the wearable device as the pairing keys in the pairing requests, and the mobile terminal and the wearable device can be directly determined, which is beneficial for simplifying user's operation and increasing accuracy of pairing.

In the above-described technical solution, preferably, the wearable device further includes a second status determining unit configured to determine whether or not the wearable device has entered the triggering state of pairing. Wherein, when the wearable device has entered the triggering state of pairing, the second pairing processing unit executes the corresponding processing operation.

In the technical solution, as the user may walk, run, or do other movement, the mobile terminal and the wearable device may be always in a motion status. Thus, to avoid pairing and connection caused by accident, in particular, under the condition that connection between both is cut off in response to user's operation due to low power of one party, whether or not the motion information needs to be collected and whether or not it needs to execute the pairing and connection operation on the mobile terminal and the wearable device may be determined according to determination of the status of the mobile terminal and the wearable device.

In the above-mentioned technical solution, preferably, the second status determining unit includes a second instruction receiving and determining sub-unit and/or a second information comparing and determining sub-unit. Wherein, the second instruction receiving and determining unit is configured to determine whether or not the wearable device has received a triggering and starting instruction generated in response to user's operation before the second information recording unit records the second motion information. If yes, it can be determined that the wearable device has entered the triggering status of pairing. The second information comparing and determining sub-unit is configured to compare the second motion information with preset motion information. If the second motion information satisfies the preset motion information, it can be determined that the wearable device has entered the triggering status of pairing.

In the technical solution, under one condition, before executing the pairing and connection operation, the pairing function of the mobile terminal or the wearable device is enabled in response to user's operation, for example, in response to a designated instruction input by the user or in response to a press on a designated button. Then, the mobile terminal or the wearable device executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal or the wearable device automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal or the wearable device satisfies the preset motion information, the mobile terminal or the wearable device automatically determines that it needs to execute the pairing operation, and generates the corresponding pairing request or executes a parsing operation and a determination and process operation on the received pairing request according to the collected motion information corresponding to the preset motion information.

In the above-described technical solution, preferably, the wearable device is a smart watch. Certainly, the present application can be also applied to other existing wearable devices or wearable devices which are still in development and may be improved based on existing wearable items, such as smart bracelets, smart bands, smart caps, smart necklaces, and so on.

The present invention provides an equipment pairing method used to realize pairing between a mobile terminal and a wearable device. The method includes: an information obtaining step, recording a first motion information of the mobile terminal by the mobile terminal, and recording a second motion information of the wearable device by the wearable device; an information interaction step, transmitting a first pairing request comprising the first motion information which will be used as a pairing key by the mobile terminal, or transmitting a second pairing request comprising the second motion information which will be used as a pairing key by the wearable device; a pairing step, responding to the first pairing request by the wearable device when the wearable device receives the first pairing request and the first motion information matches the second motion information, to realize pairing and connection between the wearable device and the mobile terminal, or responding to the second pairing request by the mobile terminal when the mobile terminal receives the second pairing request and the second motion information matches the first motion information, to realize pairing and connection between the mobile terminal and the wearable device.

In the technical solution, as the wearable device is worn by a user, for example, a smart watch is worn on the user's wrist, e.g., the wrist of the left hand, when the mobile terminal is hold by the left hand of the user and the user moves the left hand, e.g., waves the left hand left and right, shakes the left hand up and down, the motion of the smart watch and the mobile terminal is synchronous. In this process, what's only needed is that the hand holding the mobile terminal is the hand on which the smart watch is worn, and no special request is needed. That is, it only needs the user to hold the mobile terminal when doing exercise, and the characteristic of that the wearable device can be worn on the user can be fully utilized.

Therefore, when the user does exercise with the wearable device and the mobile terminal carried around, as the motion of the wearable device and the mobile terminal is synchronous, other terminals can be excluded according to the motion information of the mobile terminal and the wearable device by respectively utilizing the motion information of the mobile terminal and the wearable device as the pairing keys in the pairing requests, and the mobile terminal and the wearable device can be directly determined, which is beneficial for simplifying user's operation and increasing accuracy of pairing.

In the above-described technical solution, preferably, the first motion information includes first motion parameters of the mobile terminal and/or time corresponding to the first motion parameters. The second motion information includes second motion parameters of the wearable device and/or time corresponding to the second motion parameters.

In the technical solution, for the wearable device and the mobile terminal which motion is synchronous, as both do same movement at the same time, according to synchronicity of the motion parameters, synchronicity of the motion time, or a combination of both, the wearable device and the mobile terminal can be effectively recognized and determined. When the motion parameters or the motion time is used to make a pairing and recognition, it is beneficial for simplifying the structure of the mobile terminal or the wearable device and decreasing the cost. When a combination of the motion parameters and the motion time is used to make a pairing and recognition, it is beneficial for increasing the accuracy of pairing and recognition. It should be illustrated that the time corresponding to the first/second motion parameters refers to the start and end time of obtaining the first/second motion parameters, and/or an interval between the start time and the end time.

In the above-described technical solution, preferably, the first motion parameters and the second motion parameters respectively include at least one of or a combination of the following: motion direction, motion speed and/or motion acceleration speed, and motion distance. Wherein, the motion speed includes a linear speed and/or an angular speed, and the motion acceleration speed includes a linear acceleration speed and/or an angular acceleration speed. The mobile terminal can further determine a corresponding motion track according to its motion direction and motion distance, and the motion track is used as the motion parameters to recognize and determine the other party, and the wearable device can further determine a corresponding motion track according to its motion direction and motion distance, and the motion track is used as the motion parameters to recognize and determine the other party.

In the above-described technical solution, preferably, the wearable device is a smart watch. Certainly, the present application can be also applied to other existing wearable devices or wearable devices which are still in development and may be improved based on existing wearable items, such as smart bracelets, smart bands, smart caps, smart necklaces, and so on.

In the technical solution, preferably, before the information interaction step, the method further includes determining whether or not the mobile terminal has entered the triggering state of pairing by the mobile terminal and determining whether or not the wearable device has entered the triggering state of pairing by the wearable device. When both of the mobile terminal and the wearable device have entered the triggering state of pairing, the mobile terminal or the wearable device executes the corresponding operation.

In the technical solution, as the user may walk, run, or do other movement, the mobile terminal and the wearable device may be always in a motion status. Thus, to avoid pairing and connection caused by accident, in particular, under the condition that connection between both is cut off in response to user' operation due to low power of one party, whether or not the motion information needs to be collected and whether or not it needs to execute a pairing and connection operation on the mobile terminal and the wearable device may be determined according to determination of the status of the mobile terminal and the wearable device.

In the above-described technical solution, preferably, the process of determining whether or not the mobile terminal has entered the triggering state of pairing and determining whether or not the wearable device has entered the triggering state of pairing comprises determining whether or not the mobile terminal has received a triggering and starting instruction generated in response to user's operation by the mobile terminal and determining whether or not the wearable device has received a triggering and starting instruction generated in response to user's operation by the wearable device before the information obtaining step. If the mobile terminal has received the triggering and starting instruction, it is determined that the mobile terminal has entered the triggering state of pairing, and if the wearable device has received the triggering and starting instruction, it is determined that the wearable device has entered the triggering state of pairing, and/or in the information obtaining step, the mobile terminal compares the first motion information with preset motion information, and the wearable device compares the second motion information with the preset motion information. If the first motion information satisfies the preset motion information, it is determined that the mobile terminal has entered the triggering state of pairing, and if the second motion information satisfies the preset motion information, it is determined that the wearable device has entered the triggering state of pairing.

In the technical solution, under one condition, before executing the pairing and connection operation, the pairing function of the mobile terminal or the wearable device is enabled in response to user's operation, for example, in response to a designated instruction input by the user or in response to a press on a designated button. Then, the mobile terminal or the wearable device executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal or the wearable device automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal or the wearable device satisfies the preset motion information, the mobile terminal or the wearable device automatically determines that it needs to execute the pairing operation, and generates the corresponding pairing request or executes a parsing operation and a determination and process operation on the received pairing request according to the collected motion information corresponding to the preset motion information.

By means of the technical solution of the technical solution, the synchronicity between the wearable device and the user's limb on which the wearable device is worn can be fully utilized, to achieve pairing and connection between the terminal and the wearable device conveniently and accurately.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
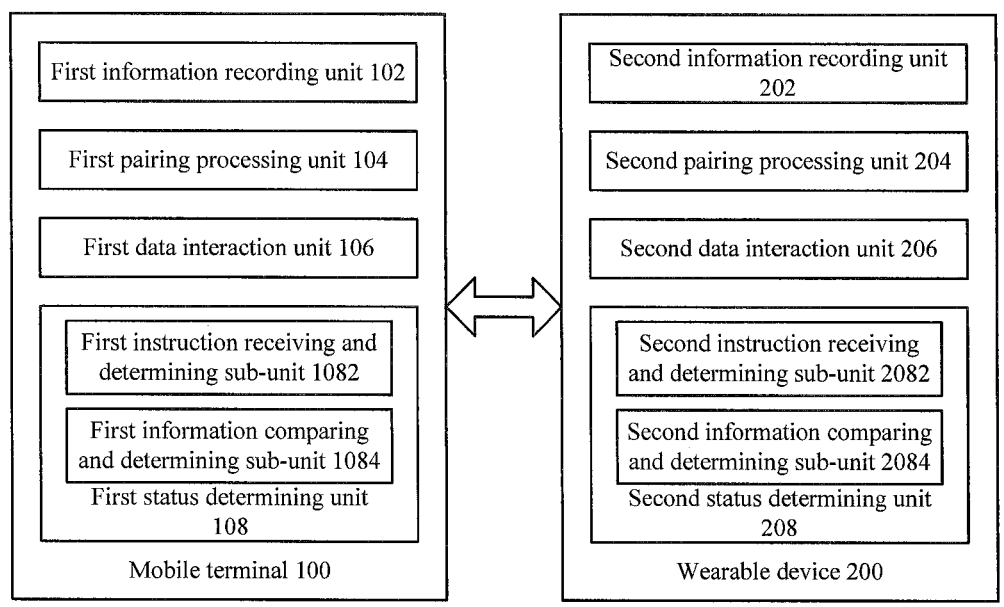
FIG. 1 is a block diagram of a mobile terminal and a wearable device in accordance with an exemplary embodiment of the present invention.

FIG. 1 is a block diagram of a mobile terminal and a wearable device in accordance with an exemplary embodiment of the present invention.

As shown in FIG. 1, a mobile terminal 100 in accordance with an exemplary embodiment of the present invention includes a first information recording unit 102 configured to record first motion information of the mobile terminal 100, and a first pairing processing unit 104 configured to generate a first pairing request. The first pairing request includes the first motion information which will be used as a pairing key, or a second pairing request is parsed. The second pairing request is received from a wearable device 200 by a first data interaction unit 106, and the second pairing request includes second motion information from the wearable device 200 which will be used as a pairing key. Wherein, when the second motion information matches the first motion information, the first pairing processing unit 104 is further configured to generate a response message for the second pairing request, to realize pairing and connection between the mobile terminal 100 and the wearable device 200. The first data interaction unit 106 is configured to transmit the first pairing request, or configured to receive the second pairing request and transmit the corresponding response message.

Accordingly, the wearable device 200 in accordance with an exemplary embodiment of the present invention includes a second information recording unit 202 configured to record the second motion information of the wearable device 200, and a second pairing processing unit 204 configured to generate the second pairing request. The second pairing request includes the second motion information which will be used as a pairing key, or the first pairing request which is received from the mobile terminal 100 by a second data interaction unit 206 is parsed. Wherein, when the parsed first motion information matches the second motion information, the second pairing processing unit 204 is further configured to generate a response message for the first pairing request, to realize pairing and connection between the wearable device 200 and the mobile terminal 100. The second data interaction unit 206 is configured to transmit the second pairing request, or configured to receive the first pairing request and transmit the corresponding response message.

In the technical solution, as the wearable device 200 is worn by a user, for example, a smart watch is worn on the user's wrist, e.g., the wrist of the left hand, when the mobile terminal 100 is hold by the left hand of the user and the user moves the left hand, e.g., waves the left hand left and right, shakes the left hand up and down, the motion of the smart watch and the mobile terminal 100 is synchronous. In this process, what's only needed is that the hand holding the mobile terminal 100 is the hand on which the wearable device 200 (e.g., smart watch) is worn, and no special request is needed. That is, it only needs the user to hold the mobile terminal 100 when doing exercise, and the characteristic of that the wearable device 200 can be worn on the user can be fully utilized.

Therefore, when the user does exercise with the wearable device 200 and the mobile terminal 100 carried around, as the motion of the wearable device 200 and the mobile terminal 100 is synchronous, other terminals can be excluded according to the motion information of the mobile terminal 100 and the wearable device 200 by respectively utilizing the motion information of the mobile terminal 100 and the wearable device 200 as the pairing keys in the pairing requests, and the mobile terminal 100 and the wearable device 200 can be directly determined, which is beneficial for simplifying user's operation and increasing accuracy of pairing.

In the above-described technical solution, preferably, the first motion information includes first motion parameters of the mobile terminal 100 and/or time corresponding to the first motion parameters. The second motion information includes second motion parameters of the wearable device 200 and/or time corresponding to the second motion parameters.

In the technical solution, for the wearable device 200 and the mobile terminal 100 which motion is synchronous, as both do same movement at the same time, according to synchronicity of the motion parameters, synchronicity of the motion time, or a combination of both, the wearable device 200 and the mobile terminal can be effectively recognized and determined. When the motion parameters or the motion time is used to make a pairing and recognition, it is beneficial for simplifying the structure of the mobile terminal 100 or the wearable device 200 and decreasing the cost. When a combination of the motion parameters and the motion time is used to make a pairing and recognition, it is beneficial for increasing the accuracy of pairing and recognition. It should be illustrated that the time corresponding to the first/second motion parameters refers to the start and end time of obtaining the first/second motion parameters, and/or an interval between the start time and the end time.

In the above-described technical solution, preferably, the first motion parameters and the second motion parameters respectively include at least one of or a combination of the following: motion direction, motion speed and/or motion acceleration speed, and motion distance. Wherein, the motion speed includes a linear speed and/or an angular speed, and the motion acceleration speed includes a linear acceleration speed and/or an angular acceleration speed. The mobile terminal 100 can further determine a corresponding motion track according to its motion direction and motion distance, and the motion track is used as the motion parameters to recognize and determine the other party, and the wearable device 200 can further determine a corresponding motion track according to its motion direction and motion distance, and the motion track is used as the motion parameters to recognize and determine the other party.

In the technical solution, preferably, the mobile terminal 100 further includes a first status determining unit 108 configured to determine whether or not the mobile terminal 100 has entered a triggering state of pairing. Wherein, when the mobile terminal 100 has entered the triggering state of pairing, the first pairing processing unit executes the corresponding operation.

In the technical solution, as the user may walk, run, or do other movement, the mobile terminal 100 and the wearable device 200 may be always in a motion status. Thus, to avoid pairing and connection caused by accident, in particular, under the condition that connection between both is cut off in response to user' operation due to low power of one party, whether or not the motion information needs to be collected and whether or not it needs to execute a pairing and connection operation on the mobile terminal 100 and the wearable device 200 may be determined according to determination of the status of the mobile terminal 100 and the wearable device 200.

In the above-mentioned technical solution, preferably, the first status determining unit 108 includes a first instruction receiving and determining sub-unit 1082 and/or a first information comparing and determining sub-unit 1084. Wherein, the first instruction receiving and determining sub-unit 1082 is configured to determine whether or not the mobile terminal 100 has received a triggering and starting instruction generated in response to user's operation before the first information recording unit 102 records the first motion information. If yes, it can be determined that the mobile terminal 100 has entered the triggering status of pairing. The first information comparing and determining sub-unit 1084 is configured to compare the first motion information with preset motion information. If the first motion information satisfies the preset motion information, it can be determined that the mobile terminal 100 has entered the triggering status of pairing.

In the technical solution, under one condition, before executing the pairing and connection operation, the pairing function of the mobile terminal 100 or the wearable device 200 is enabled in response to user's operation, for example, in response to a designated instruction input by the user or in response to a press on a designated button. Then, the mobile terminal 100 or the wearable device 200 executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal 100 or the wearable device 200 automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal 100 or the wearable device 200 satisfies the preset motion information, the mobile terminal 100 or the wearable device 200 automatically determines that it needs to execute the pairing operation, and generates the corresponding pairing request or executes a parsing operation and a determination and process operation on the received pairing request according to the collected motion information corresponding to the preset motion information.

In the above-described technical solution, preferably, the wearable device 200 further includes a second status determining unit 208 configured to determine whether or not the wearable device 200 has entered the triggering state of pairing. Wherein, when the wearable device 200 has entered the triggering state of pairing, the second pairing processing unit executes the corresponding processing operation.

In the technical solution, as the user may walk, run, or do other movement, the mobile terminal 100 and the wearable device 200 may be always in a motion status. Thus, to avoid pairing and connection caused by accident, in particular, under the condition that connection between both is cut off in response to user's operation due to low power of one party, whether or not the motion information needs to be collected and whether or not it needs to execute the pairing and connection operation on the mobile terminal 100 and the wearable device 200 may be determined according to determination of the status of the mobile terminal 100 and the wearable device 200.

In the above-mentioned technical solution, preferably, the second status determining unit 208 includes a second instruction receiving and determining sub-unit 2082 and/or a second information comparing and determining sub-unit 2084. Wherein, the second instruction receiving and determining unit 2082 is configured to determine whether or not the wearable device 200 has received a triggering and starting instruction generated in response to user's operation before the second information recording unit 202 records the second motion information. If yes, it can be determined that the wearable device 200 has entered the triggering status of pairing. The second information comparing and determining sub-unit 2084 is configured to compare the second motion information with preset motion information. If the second motion information satisfies the preset motion information, it can be determined that the wearable device 200 has entered the triggering status of pairing.

In the technical solution, under one condition, before executing the pairing and connection operation, the pairing function of the mobile terminal 100 or the wearable device 200 is enabled in response to user's operation, for example, in response to a designated instruction input by the user or in response to a press on a designated button. Then, the mobile terminal 100 or the wearable device 200 executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal 100 or the wearable device 200 automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal 100 or the wearable device 200 satisfies the preset motion information, the mobile terminal 100 or the wearable device 200 automatically determines that it needs to execute the pairing operation, and generates the corresponding pairing request or executes a parsing operation and a determination and process operation on the received pairing request according to the collected motion information corresponding to the preset motion information.

In the above-described technical solution, preferably, the wearable device 200 is a smart watch. Certainly, the present application can be also applied to other existing wearable devices 200 or wearable devices 200 which are still in development and may be improved based on existing wearable items, such as smart bracelets, smart bands, smart caps, smart necklaces, and so on.

Figure 2:
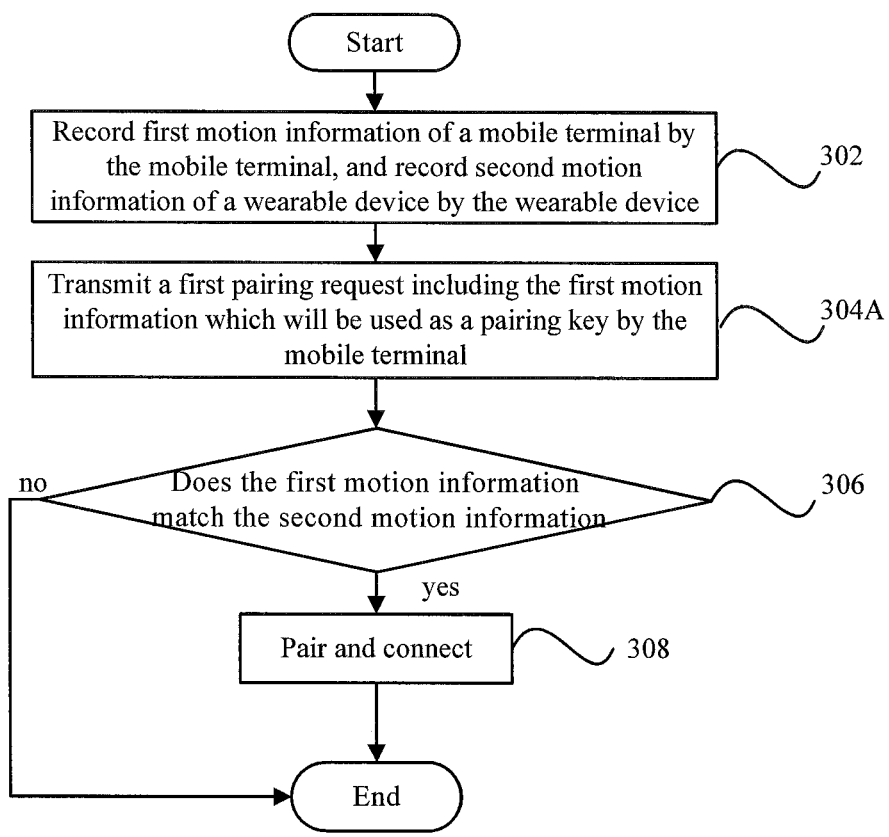
FIG. 2 is a flow chart of an equipment pairing method in accordance with an exemplary embodiment of the present invention.
Figure 3:
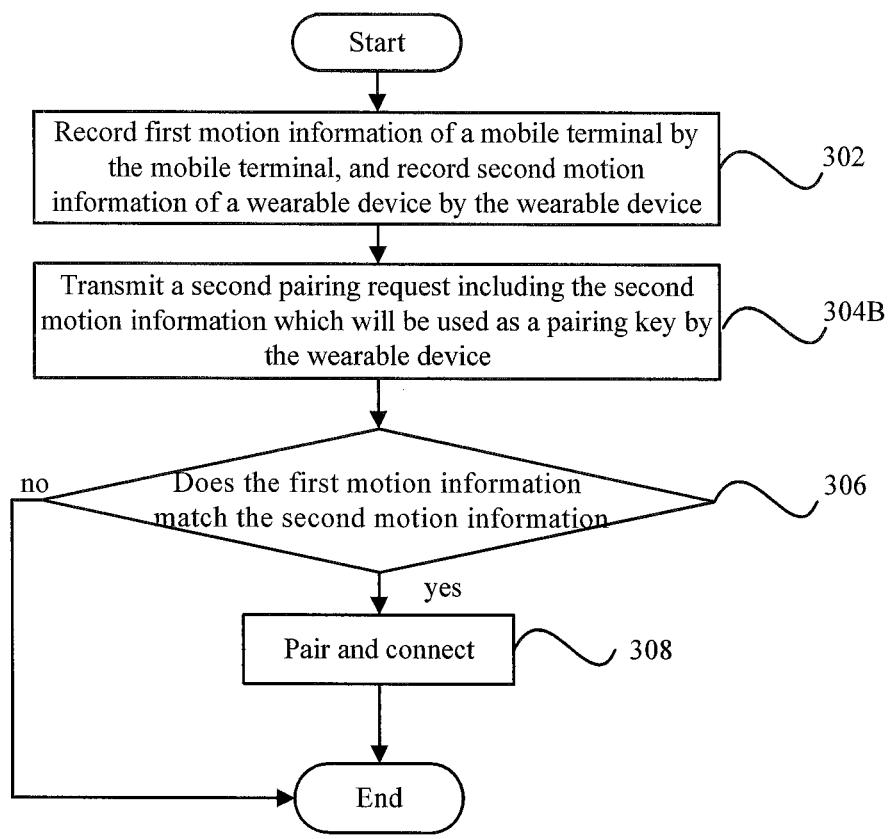
FIG. 3 is a flow chart of an equipment pairing method in accordance with another embodiment of the present invention.

The following will illustrate an equipment pairing method of the present invention in detail in combination with FIG. 2 and FIG. 3. Wherein, FIG. 2 shows a flow chart of an equipment pairing method in accordance with an exemplary embodiment of the present invention. FIG. 3 shows a flow chart of an equipment pairing method in accordance with another exemplary embodiment of the present invention.

As shown in FIG. 2 and FIG. 3, the equipment pairing method according to an exemplary embodiment of the present invention is used to realize pairing between the mobile terminal and the wearable device. The method includes the following.

In step 302 which is an information obtaining step, recording a first motion information of the mobile terminal by the mobile terminal, and recording a second motion information of the wearable device by the wearable device.

Under a first condition, the mobile terminal generates a pairing request, and the wearable device responds to the pairing request.

As shown in FIG. 2, in step 304A, transmitting a first pairing request including the first motion information which will be used as a pairing key by the mobile terminal.

Under a second condition, the wearable device generates the pairing request, and the mobile terminal responds to the pairing request.

As shown in FIG. 3, in step 304B, transmitting a second pairing request including the second motion information which will be used as a pairing key by the wearable device.

In step 306, for the first condition, determining whether or not the first motion information matches the second motion information when the wearable device receives the first pairing request. For the second condition, determining whether or not the second motion information matches the first motion information when the mobile terminal receives the second pairing request.

In step 308, for the first condition, responding to the first pairing request by the wearable device when the first motion information matches the second motion information, to realize pairing and connection between the wearable device and the mobile terminal. For the second condition, responding to the second pairing request by the mobile terminal when the second motion information matches the first motion information, to realize pairing and connection between the mobile terminal and the wearable device.

In the technical solution, as the wearable device is worn by a user, for example, a smart watch is worn on the user's wrist, e.g., the wrist of the left hand, when the mobile terminal is hold by the left hand of the user and the user moves the left hand, e.g., waves the left hand left and right, shakes the left hand up and down, the motion of the smart watch and the mobile terminal is synchronous. In this process, what's only needed is that the hand holding the mobile terminal is the hand on which the smart watch is worn, and no special request is needed. That is, it only needs the user to hold the mobile terminal when doing exercise, and the characteristic of that the wearable device can be worn on the user can be fully utilized.

Therefore, when the user does exercise with the wearable device and the mobile terminal carried around, as the motion of the wearable device and the mobile terminal is synchronous, other terminals can be excluded according to the motion information of the mobile terminal and the wearable device by respectively utilizing the motion information of the mobile terminal and the wearable device as the pairing keys in the pairing requests, and the mobile terminal and the wearable device can be directly determined, which is beneficial for simplifying user's operation and increasing accuracy of pairing.

In the above-described technical solution, preferably, the first motion information includes first motion parameters of the mobile terminal and/or time corresponding to the first motion parameters. The second motion information includes second motion parameters of the wearable device and/or time corresponding to the second motion parameters.

In the technical solution, for the wearable device and the mobile terminal which motion is synchronous, as both do same movement at the same time, according to synchronicity of the motion parameters, synchronicity of the motion time, or a combination of both, the wearable device and the mobile terminal can be effectively recognized and determined. When the motion parameters or the motion time is used to make a pairing and recognition, it is beneficial for simplifying the structure of the mobile terminal or the wearable device and decreasing the cost. When a combination of the motion parameters and the motion time is used to make a pairing and recognition, it is beneficial for increasing the accuracy of pairing and recognition. It should be illustrated that the time corresponding to the first/second motion parameters refers to the start and end time of obtaining the first/second motion parameters, and/or an interval between the start time and the end time.

In the above-described technical solution, preferably, the first motion parameters and the second motion parameters respectively include at least one of or a combination of the following: motion direction, motion speed and/or motion acceleration speed, and motion distance. Wherein, the motion speed includes a linear speed and/or an angular speed, and the motion acceleration speed includes a linear acceleration speed and/or an angular acceleration speed. The mobile terminal can further determine a corresponding motion track according to its motion direction and motion distance, and the motion track is used as the motion parameters to recognize and determine the other party, and the wearable device can further determine a corresponding motion track according to its motion direction and motion distance, and the motion track is used as the motion parameters to recognize and determine the other party.

In the above-described technical solution, preferably, the wearable device is a smart watch. Certainly, the present application can be also applied to other existing wearable devices or wearable devices which are still in development and may be improved based on existing wearable items, such as smart bracelets, smart bands, smart caps, smart necklaces, and so on.

In the technical solution, preferably, before the information interaction step, the method further includes determining whether or not the mobile terminal has entered the triggering state of pairing by the mobile terminal and determining whether or not the wearable device has entered the triggering state of pairing by the wearable device. when both of the mobile terminal and the wearable device have entered the triggering state of pairing, the mobile terminal or the wearable device executes the corresponding operation.

In the technical solution, as the user may walk, run, or do other movement, the mobile terminal and the wearable device may be always in a motion status. Thus, to avoid pairing and connection caused by accident, in particular, under the condition that connection between both is cut off in response to user' operation due to low power of one party, whether or not the motion information needs to be collected and whether or not it needs to execute a pairing and connection operation on the mobile terminal and the wearable device may be determined according to determination of the status of the mobile terminal and the wearable device.

In the above-described technical solution, preferably, the process of determining whether or not the mobile terminal has entered the triggering state of pairing and determining whether or not the wearable device has entered the triggering state of pairing comprises determining whether or not the mobile terminal has received a triggering and starting instruction generated in response to user's operation by the mobile terminal and determining whether or not the wearable device has received a triggering and starting instruction generated in response to user's operation by the wearable device before the information obtaining step. If the mobile terminal has received the triggering and starting instruction, it is determined that the mobile terminal has entered the triggering state of pairing, and if the wearable device has received the triggering and starting instruction, it is determined that the wearable device has entered the triggering state of pairing, and/or in the information obtaining step, the mobile terminal compares the first motion information with preset motion information, and the wearable device compares the second motion information with the preset motion information. If the first motion information satisfies the preset motion information, it is determined that the mobile terminal has entered the triggering state of pairing, and if the second motion information satisfies the preset motion information, it is determined that the wearable device has entered the triggering state of pairing.

In the technical solution, under one condition, before executing the pairing and connection operation, the pairing function of the mobile terminal or the wearable device is enabled in response to user's operation, for example, in response to a designated instruction input by the user or in response to a press on a designated button. Then, the mobile terminal or the wearable device executes a collection operation on the motion information and executes subsequent pairing process. When finishing pairing, the pairing function is automatically disabled. Or when the user determines that pairing is not needed, the pairing function is disabled in response to user's operation. Under another condition, the pairing function is enabled and disabled without user's participation, and the mobile terminal or the wearable device automatically collects its motion information. The collected motion information is compared with the preset motion information. For example, the preset motion information is that moving up and down at a frequency greater than or equal to f for S seconds or more (generally, this condition can be distinguished from a condition which is not caused by the user, and it can be set according to user's need or manufacture's need). If the motion information of the mobile terminal or the wearable device satisfies the preset motion information, the mobile terminal or the wearable device automatically determines that it needs to execute the pairing operation, and generates the corresponding pairing request or executes a parsing operation and a determination and process operation on the received pairing request according to the collected motion information corresponding to the preset motion information.

Figure 4:
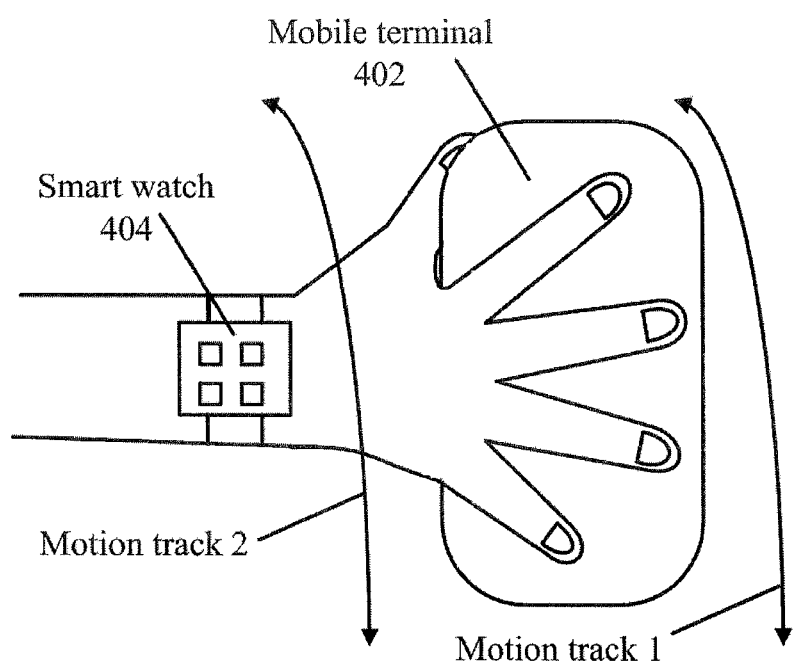
FIG. 4 is a schematic view showing synchronous motion of a mobile terminal and a smart watch in accordance with an exemplary embodiment of the present invention.

FIG. 4 is a schematic view showing synchronous motion of a mobile terminal and a smart watch in accordance with an exemplary embodiment of the present invention.

As illustrated in the background, wearable devices have features which are not owned by other terminals, that is, wearable devices can be worn on user's limbs. Therefore, for the mobile terminal hold by a user, when the user does exercise, the motion of the wearable device and the mobile terminal on a same limb or on a same part of a limb is synchronous.

The following will take a smart watch and a mobile terminal as an example to illustrate the present invention.

As shown in FIG. 4, if a mobile terminal 402 and a smart watch 404 are on a same arm, when the user moves the arm (e.g., flings the arm, rotates the arm, or shakes the arm up and down, or the like), the mobile terminal 402 and the smart watch 404 do consistent movement with the movement of the arm, and the motion of the mobile terminal 402 and the smart watch 404 is synchronous.

The following describes the details of the above-described synchronicity.

Firstly, the motion parameters are synchronous. For example, when the user shakes his/her arm up and down (or swings the arm left and right), the motion directions, the motion angles, the motion speeds, the motion acceleration speeds of the mobile terminal 402 and the smart watch 404 are consistent (the same or there is very small difference). Specifically, for example, motion tracks shown in FIG. 4 show the consistence. Wherein, the motion track of the mobile terminal 402 is the motion track 1, the motion track of the mobile terminal 404 is the motion track 2, and the two motion tracks are matched to each other (the same, or there is very small difference, or there is a proportion relationship between the two motion tracks).

Secondly, the time of the movement of the mobile terminal 402 and the smart watch 404 is synchronous. As the mobile terminal 402 and the smart watch 404 are on a same arm, the mobile terminal 402 and the smart watch 404 starts to move nearly at the same time, and finishes moving nearly at the same time.

Therefore, by considering the synchronous of the motion parameters and/or motion time, the mobile terminal 402 and the smart watch 404 can be effectively recognized, thus accurate pairing between both can be realized.

To realize pairing between the mobile terminal 402 and the smart watch 404, corresponding functional modules can be determined.

Figure 5:
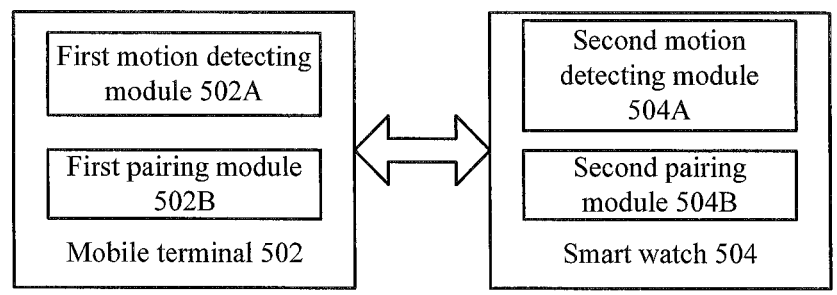
FIG. 5 is a schematic view showing structures of a mobile terminal and a smart watch in accordance with an exemplary embodiment of the present invention.

As shown in FIG. 5, when a pairing operation based on the present invention is executed on a mobile terminal 502 and a smart watch 504, the mobile terminal 502 includes a first motion detecting module 502A and a first pairing module 502B, and the smart watch 504 includes a second motion detecting module 504A and a second pairing module 504B.

Wherein, the first motion detecting module 502A is configured to detect motion track data of the mobile terminal 502, and process the motion track data to obtain corresponding motion data (e.g., motion angular speed and motion start time). The second motion detecting module 504A is configured to detect motion track data of the smart watch 504, and process the motion track data to obtain corresponding motion data (e.g., motion angular speed and motion start time). According to the motion data of the mobile terminal 502 and the smart watch 504, pairing keys can be provided to trigger pairing.

The first pairing module 502B and the second pairing module 504B are both configured to realize pairing between the mobile terminal 502 and the smart watch 504. When it is detected that the mobile terminal 502 and the smart watch 504 are in preset motion status (for example, under a first condition, it is detected that any motion angular speed of the mobile terminal 502 exceeds a threshold or a variation frequency of the acceleration speed of the mobile terminal 502 exceeds a threshold, and it is detected that any motion angular speed of the smart watch 504 exceeds a threshold or a variation frequency of the acceleration speed of the smart watch 504 exceeds a threshold, it is determined that human movement happens and pairing is needed. Under a second condition, when it is detected that the motion data of the mobile terminal 502 satisfies preset motion data and the motion data of the wearable device 504 satisfies preset motion data, for example, it is determined that the mobile terminal 502 and the smart watch 504 are shaken up and down, or are swung in a horizontal direction, and the amplitude or times reach a preset threshold), the mobile terminal 502 opens its wireless pairing connection device (e.g., wifi, bluetooth, or the like) and the smart watch 504 opens its wireless pairing connection device (e.g., wifi, bluetooth, or the like).

The first pairing module 502B of the mobile terminal 502 issues a pairing request according to a pairing key. When the smart watch 504 receives the pairing request, the smart watch 504 compares the received pairing key (motion data) with its motion data. If there is a match, the smart watch 504 determines the pairing request and finishes the pairing process.

Or the second pairing module 504B of the smart watch 504 issues a pairing request according to a pairing key. When the mobile terminal 502 receives the pairing request, the mobile terminal 502 compares the received pairing key (motion data) with its motion data. If there is a match, the mobile terminal 502 determines the pairing request and finishes the pairing process.

Figure 6:
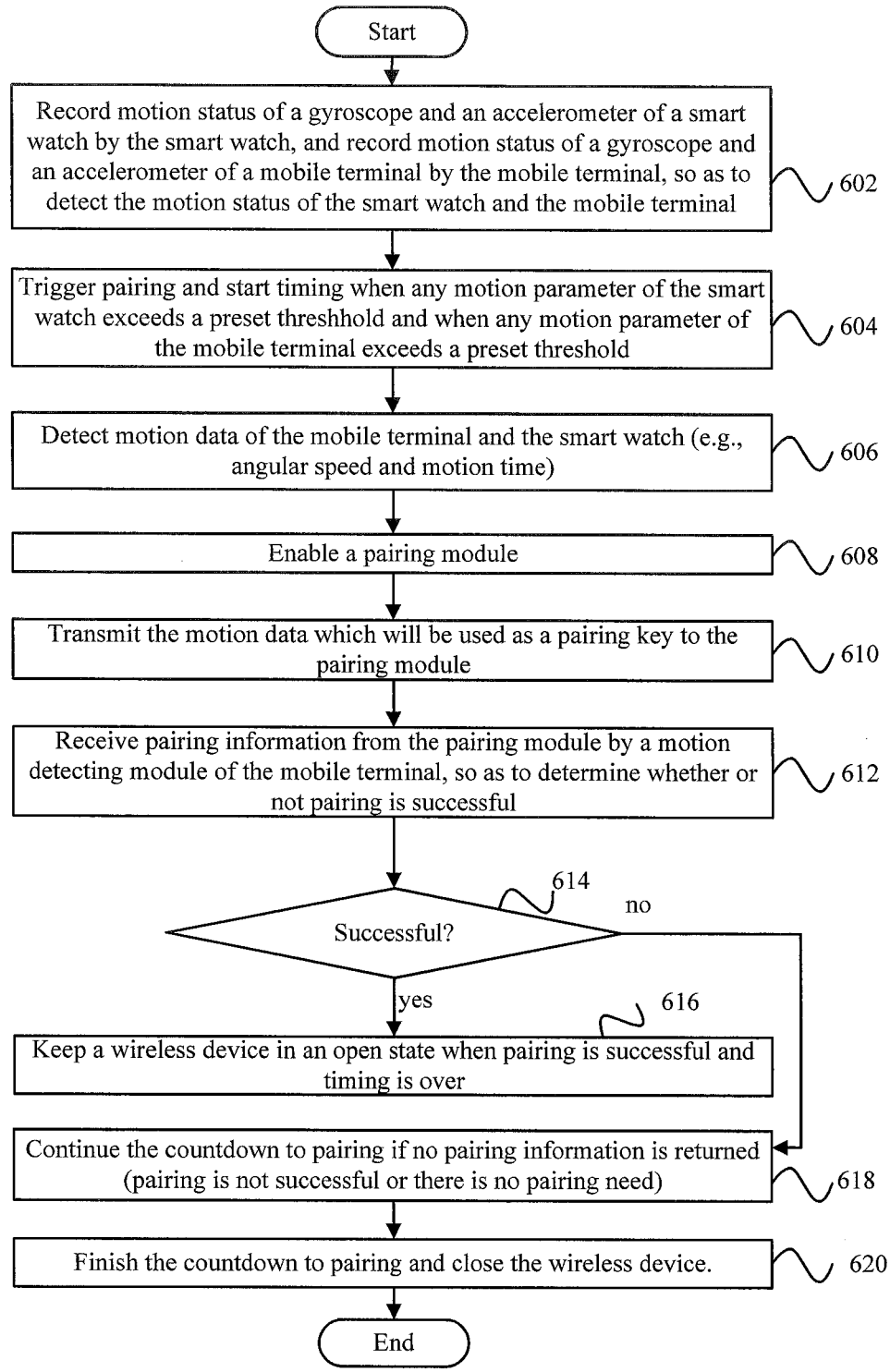
FIG. 6 is a flow chart of a motion detection process in accordance with an exemplary embodiment of the present invention.
Figure 7:
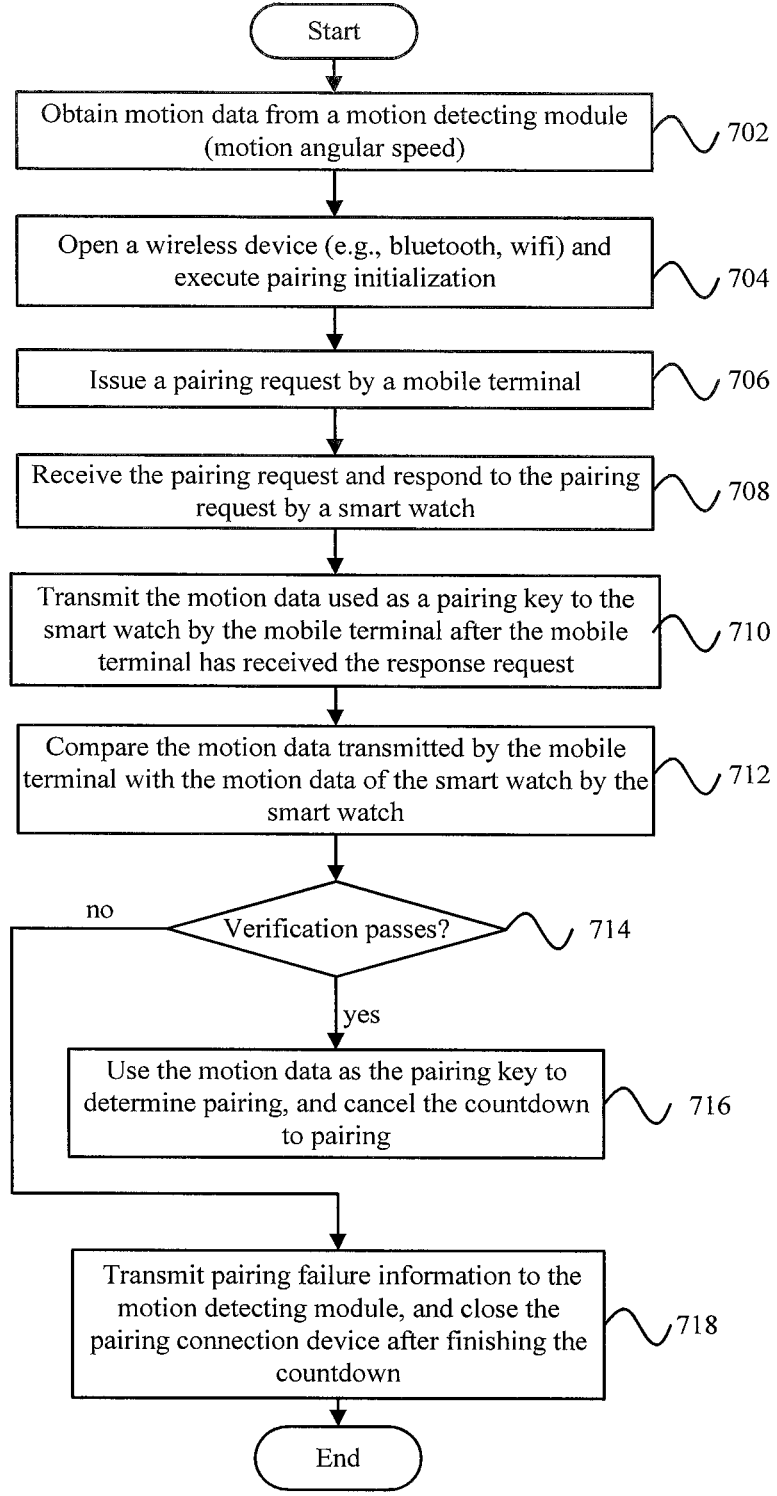
FIG. 7 is a flow chart of a pairing process in accordance with an exemplary embodiment of the present invention.

The following will illustrate a motion detection process and a pairing process in detail in combination with FIG. 6 and FIG. 7.

FIG. 6 shows a flow chart of the motion detection process in accordance with an exemplary embodiment of the present invention.

As shown in FIG. 6, the motion detection process in accordance with an exemplary embodiment of the present invention includes the following.

In step 602, recording motion status of a gyroscope and an accelerometer of the smart watch by the smart watch, and recording motion status of a gyroscope and an accelerometer of the mobile terminal by the mobile terminal, so as to detect the motion status of the smart watch and the mobile terminal.

In step 604, triggering pairing and starting timing when any motion parameter of the smart watch exceeds a preset threshold and when any motion parameter of the mobile terminal exceeds a preset threshold.

The above-described steps are actually used to illustrate at what time the mobile terminal and the smart watch will start the pairing process. The mobile terminal detects its motion data and compares its motion data with preset motion data to determine whether or not to start the pairing process, and the smart watch detects its motion data and compares its motion data with preset motion data to determine whether or not to start the pairing process. Certainly, what motion detecting devices will be used may be determined according to the motion status which is set by the manufacture or the user to receive a detection. For example, if the user sets that only the acceleration speed will be used to make a determination, the data of the gyroscope may not be collected and recorded. One kind of or more kinds of the collected motion data are compared with preset parameter thresholds. If preset condition is satisfied (e.g, greater than preset thresholds), the pairing process is started.

In step 606, detecting motion data of the mobile terminal and the smart watch. The motion data includes motion parameters and motion time. Wherein, the motion parameters refer to motion angle, motion speed, motion acceleration speed speed, and so on. The motion time refers to the start and end time of detecting the motion parameters or the length of time of the whole process. Certainly, step 606 may not be executed, and the motion data obtained in step 602 can be directly used.

However, by setting two parameter obtaining steps, the process becomes more flexible. For example, step 602 can be set to be a simple parameter obtaining process, so as to decrease the difficulty of obtaining parameters. While step 606 can be set to be a complex parameter obtaining process, so as to increase accuracy. In step 608, enabling the pairing modules of the mobile terminal and the smart watch.

In step 610, transmitting the motion data which will be used as a pairing key to the first pairing module by the mobile terminal, so as to transmit a pairing request including the pairing key to the smart watch (transmit the pairing request to a certain range within the mobile terminal and does not transmit the pairing request to the smart watch by point-to-point transmission) to realize pairing.

In step 612, receiving pairing information from the first pairing module by the first motion detecting module of the mobile terminal, so as to determine whether or not pairing is successful. Herein, the condition of the mobile terminal issuing the pairing information is used as an example. Actually and obviously, the condition of the smart watch issuing the pairing information can also be used as an example, and the process is similar and will not be repeated herein.

In step 614, going to step 616 if pairing is successful, and going to step 618 if pairing is not successful.

In step 616, keeping the wireless device in an open state when pairing is successful and timing is over.

In step 618, continuing the countdown to pairing if no pairing information is returned (pairing is not successful or there is no pairing need).

In step 602, finishing the countdown to pairing and closing the wireless device.

FIG. 7 is a flow chart of a pairing process in accordance with an exemplary embodiment of the present invention.

As shown in FIG. 7, the pairing process in accordance with an exemplary embodiment of the present invention includes the following.

In step 702, obtaining motion data from the second motion detecting module by the smart watch (e.g., motion angular speed, motion start time, and so on).

In step 704, opening the wireless device by the smart watch and executing pairing initialization.

In step 706, issuing a pairing request by the mobile terminal.

In step 708, receiving the pairing request issued by the mobile terminal and responding to the pairing request by the smart watch.

In step 710, transmitting the motion data of the mobile terminal to the smart watch by the mobile terminal after the mobile terminal has received the response request from the smart watch.

In step 712, comparing the paring key (motion data) transmitted by the mobile terminal with the motion data of the smart watch by the smart watch. If there is a match, it is determined that verification passes, and pairing and connection is determined.

In step 714, going to step 716 if verification passes, and going to step 718 if verification does not pass.

In step 716, determining connection if verification passes and transmitting successful pairing information to the second motion detecting module and recording the pairing information by the smart watch, and canceling the countdown.

In step 718, transmitting pairing failure information to the second motion detecting module by the smart watch, and closing the pairing connection device by the second motion detecting module after finishing the countdown to ensure safe connection.

The above illustrates the technical solution of the present invention in detail in combination with the accompanying drawings. In view of that in the existing technology wearable devices are processed as common terminal devices, the pairing process is complicated, the usage characteristics of the wearable devices are not fully utilized, and it is not beneficial for the user to use the wearable device. The present invention provides a mobile terminal, a wearable device, and an equipment pairing method. By means of these, the synchronicity between the wearable device and the user's limb on which the wearable device is worn can be fully utilized, to achieve pairing and connection between the terminal and the wearable device conveniently and accurately.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A mobile terminal comprising:
a processor comprising hardware
configured to: record first motion information, sensed by a motion sensor over time, of the mobile terminal;
generate a first pairing request when the mobile terminal receives an instruction to enable a specific pairing determination, wherein the first pairing request comprises the first motion information which will be used as a pairing key, or a second pairing request is parsed, the second pairing request is received from a wearable device, and the second pairing request comprises second motion information of the wearable device which will be used as a pairing key, the first motion information including direction and the second motion information including direction, wherein, when the second motion information matches the first motion information with respect to at least direction, the processor comprising hardware is further configured to generate a response message for the second pairing request to realize pairing and connection between the mobile terminal and the wearable device; and
the processor comprising hardware is configured to cause the transmission of the first pairing request, or configured to receive the second pairing request and cause the transmission of the corresponding response message,
wherein the first motion information comprises first parameters selected from a group consisting of first motion parameters of the mobile terminal including at least the direction and time corresponding to the first motion parameters; the second motion information comprises second parameters selected from a group consisting of second motion parameters of the wearable device including at least the direction and time corresponding to the second motion parameters.

2. The mobile terminal of claim 1, wherein the first motion parameters and the second motion parameters respectively further comprise at least one of or a combination of the following: motion speed, motion acceleration speed, and motion distance.

3. The mobile terminal of claim 2, wherein the processor comprising hardware is further configured to determine whether or not the mobile terminal has received the instruction to enable the specific pairing determination, wherein, when the mobile terminal has received the instruction to enable the specific pairing determination, the processor comprising hardware executes corresponding operation.

4. The mobile terminal of claim 1, wherein the processor comprising hardware is further configured to determine whether or not the mobile terminal has received the instruction to enable the specific pairing determination, wherein, when the mobile terminal has received the instruction to enable the specific pairing determination, the processor comprising hardware executes corresponding operation.

5. The mobile terminal of claim 4, wherein the processor comprising hardware is configured to: determine whether or not the mobile terminal has received the instruction to enable the specific pairing determination before recording the first motion information, and the processor comprising hardware is further configured to compare the first motion information with preset motion information, if the first motion information satisfies the preset motion information, it is determined that the mobile terminal has received the instruction to enable the specific pairing determination.

6. The mobile terminal of claim 1, wherein the processor comprising hardware is further configured to determine whether or not the mobile terminal has received the instruction to enable the specific pairing determination, wherein, when the mobile terminal has received the instruction to enable the specific pairing determination, the processor comprising hardware executes corresponding operation.

7. An equipment pairing method configured to realize pairing between a mobile terminal and a wearable device, the method comprising:
an information obtaining step, recording a first motion information of the mobile terminal by the mobile terminal, and recording a second motion information of the wearable device by the wearable device;
an information interaction step, transmitting a first pairing request comprising the first motion information which will be used as a pairing key by the mobile terminal when the mobile terminal receives an instruction to enable a specific pairing determination, or transmitting a second pairing request comprising the second motion information which will be used as a pairing key by the wearable device when the wearable device receives an instruction to enable a specific pairing determination, the first motion information including direction and the second motion information including direction;
a pairing step, responding to the first pairing request by the wearable device when the wearable device receives the first pairing request and the first motion information matches the second motion information with respect to at least direction, to realize pairing and connection between the wearable device and the mobile terminal, or responding to the second pairing request by the mobile terminal when the mobile terminal receives the second pairing request and the second motion information matches the first motion information with respect to at least direction, to realize pairing and connection between the mobile terminal and the wearable device,
wherein the first motion information comprises first parameters selected from a group consisting of first motion parameters of the mobile terminal including at least the direction and time corresponding to the first motion parameters; the second motion information comprises second parameters selected from a group consisting of second motion parameters of the wearable device including at least the direction and time corresponding to the second motion parameters.

8. The equipment pairing method of claim 7, wherein the first motion parameters and the second motion parameters respectively further comprise at least one of or a combination of the following: motion speed, motion acceleration speed, and motion distance.

9. The equipment pairing method of claim 8, wherein before the information interaction step, the equipment pairing method further comprises:
determining whether or not the mobile terminal has received the instruction to enable the specific pairing determination and determining whether or not the wearable device has received the instruction to enable the specific pairing determination; and executing the information interaction step by the mobile terminal or the wearable device when both of the mobile terminal and the wearable device have received the instruction to enable the specific pairing determination.

10. The equipment pairing method of claim 7, wherein the wearable device is a smart watch.

11. The equipment pairing method of claim 7, wherein before the information interaction step, the equipment pairing method further comprises:

determining whether or not the mobile terminal has received the instruction to enable the specific pairing determination and determining whether or not the wearable device has received the instruction to enable the specific pairing determination; and executing the information interaction step by the mobile terminal or the wearable device when both of the mobile terminal and the wearable device have received the instruction to enable the specific pairing determination.

12. The equipment pairing method of claim 11, wherein the determination whether the mobile terminal has received the instruction to enable the specific pairing determination is before the information obtaining step; and in the information obtaining step, comparing the first motion information with preset motion information by the mobile terminal, and comparing the second motion information with the preset motion information by the wearable device; wherein if the first motion information satisfies the preset motion information, it is determined that the mobile terminal has receiving the instruction to enable the specific pairing determination, and if the second motion information satisfies the preset motion information, it is determined that the wearable device has receiving the instruction to enable the specific pairing determination.

13. The equipment pairing method of claim 7, wherein before the information interaction step, the equipment pairing method further comprises:

determining whether or not the mobile terminal has received the instruction to enable the specific pairing determination and determining whether or not the wearable device has received the instruction to enable the specific pairing determination; and executing the information interaction step by the mobile terminal or the wearable device when both of the mobile terminal and the wearable device have received the instruction to enable the specific pairing determination.

* * * * *